March 20, 1951     R. G. SELL ET AL     2,545,863
ALTERNATING CURRENT RECTIFIER
Filed Dec. 31, 1947     2 Sheets-Sheet 1
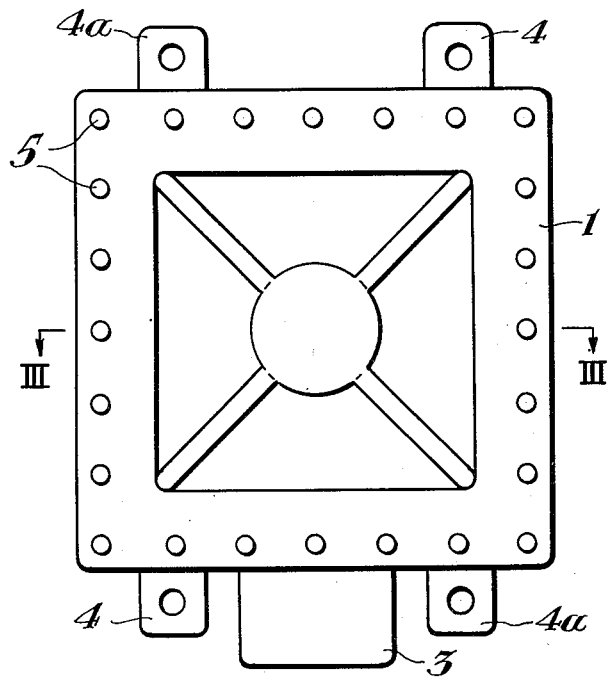
Fig. 1.
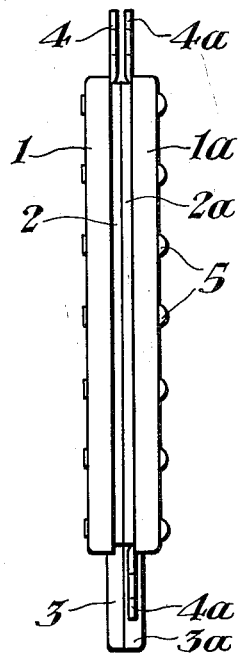
Fig. 2.
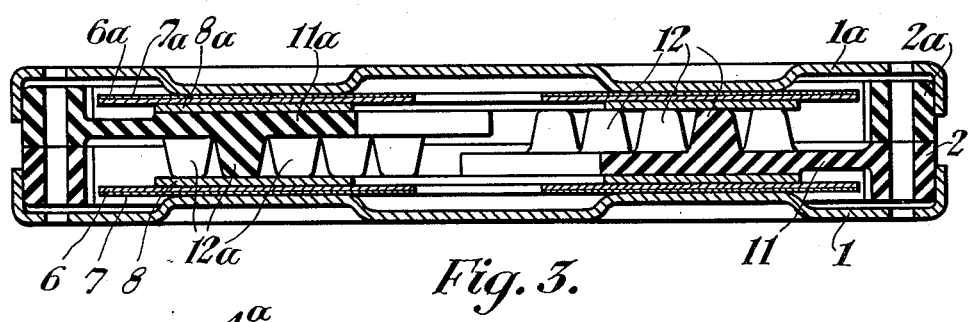
Fig. 3.
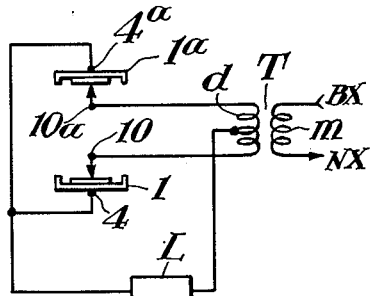
Fig. 5.
INVENTORS
Richard Geoffrey Sell and
BY Roger Harry Cubitt.
THEIR ATTORNEY March 20, 1951  R. G. SELL ET AL  2,545,863
ALTERNATING CURRENT RECTIFIER
Filed Dec. 31, 1947  2 Sheets-Sheet 2
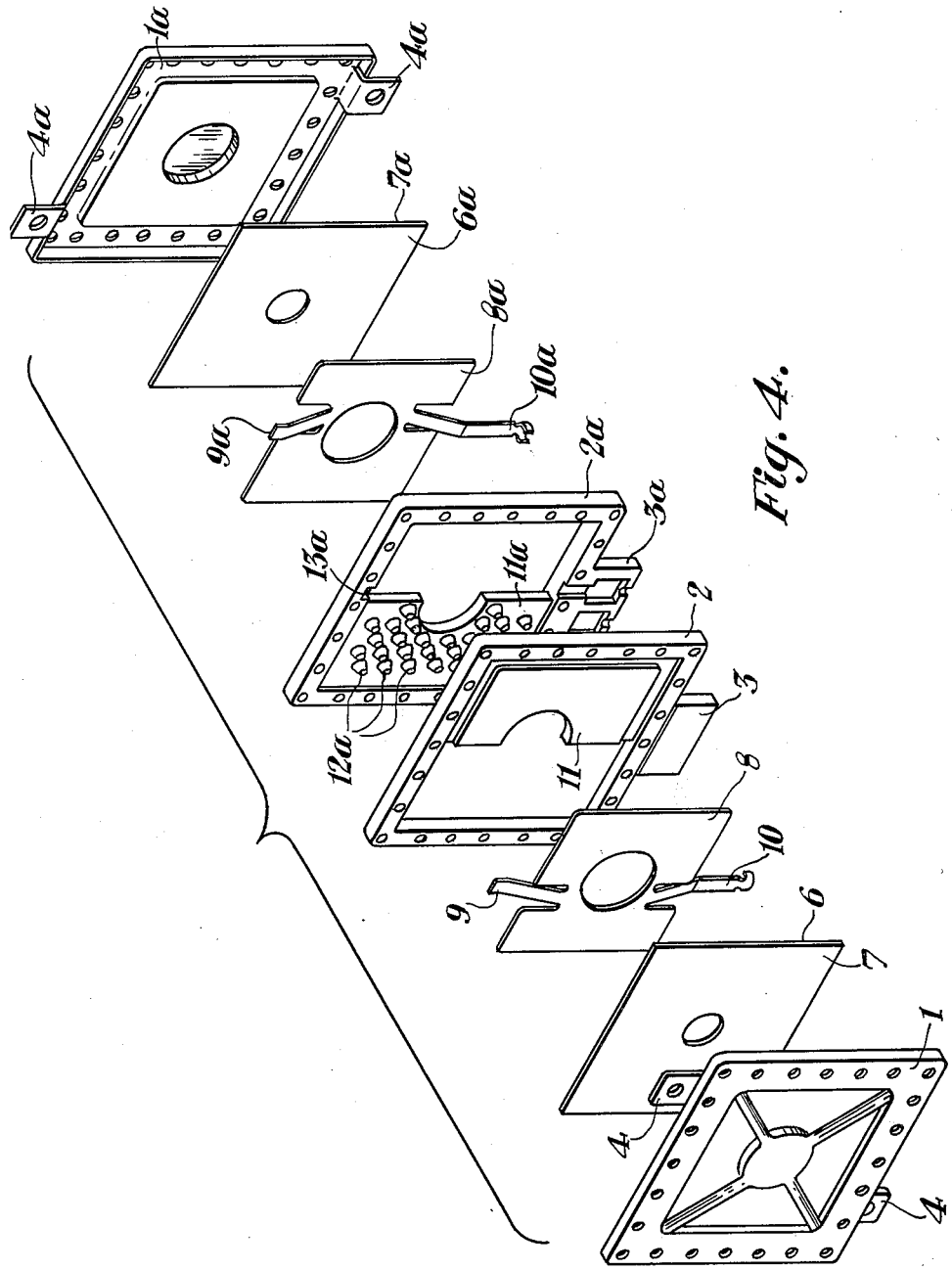
Fig. 4.
INVENTORS
Richard Geoffrey Sell and
BY Roger Harry Cubitt.
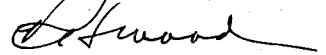
THEIR ATTORNEY Patented Mar. 20, 1951

2,545,863

UNITED STATES PATENT OFFICE 2,545,863

ALTERNATING CURRENT RECTIFIER

Richard Geoffrey Sell and Roger Harry Cubitt, London, England, assignors, by mesne assignments, to The Union Switch and Signal Company, Swissvale, Pa., a corporation of Pennsylvania Application December 31, 1947, Serial No. 795,068
In Great Britain January 6, 1947

7 Claims. (Cl. 175—366)

This invention relates to alternating current rectifiers of the dry surface contact type and has for its object to provide an improved form of assembly for rectifiers of this kind.

It is often desirable to seal rectifier assemblies against the effects of the atmosphere and one way of doing this is to mount the rectifier elements in a hermetically sealed container or casing. The problem of the efficient cooling of the rectifier elements then arises and this problem has hitherto been solved by immersing the elements in oil or by the provision of cooling fins on the casing. Such arrangements have several obvious disadvantages, among which are an increase in bulk and awkwardness of mounting in confined spaces, and in accordance with this invention the rectifier element or elements is or are mounted within a hermetically sealed metal casing in such a manner that they are in metallic contact with the casing over a substantial area of the element or elements, the casing itself acting as the cooling member without the necessity of providing special cooling fins.

Another difficulty encountered in the design of hermetically sealed rectifiers is the provision of an even but not too great pressure maintaining the rectifier elements in electrical contact with the contact members regardless of the pressure required to clamp the two halves of the casing together to form an efficient seal. According to one feature of the invention a resiliently compressible gasket is provided to act as a seal between the two halves of the outer casing and extends inwardly, the inwardly extending portion being arranged to clamp each rectifier element between a contact member and the outer casing and being so designed that the pressure exerted upon the rectifier element is less than that applied around the periphery of the gasket for the purpose of sealing.

In one embodiment of the invention the rectifier elements are contained within a casing composed of two identical and rectangular metal plates with flanged edges, spaced apart by two identical rubber spacer members, and clamped by a number of screws or rivets passing through the two plates and the periphery of the rubber spacer members. In the cavity thus formed between the metal plates are disposed two rectifier elements of the selenium type, each with its counter electrode in metallic contact with one of the two plates forming the casing. In contact with the other electrode of each rectifier element is disposed a metal contact member with a contact tag or projection which projects between the rubber spacer members into a terminal chamber or hollow lug formed in an external projection thereon.

The rubber spacer members have inwardly extending portions of reduced thickness disposed between the two contact members. Formed on the inwardly extending portions of the spacer members are a number of projections, which may conveniently be of conical shape. The arrangement is such that the tops of the conical projections bear upon one of the contact members while the inwardly extending portion of the spacer member upon which they are formed bears upon the other contact member. The thickness of the inwardly extending portion and the number, disposition and dimensions of the conical projections are so designed that, when the periphery of the spacer members is clamped between the casing plates so as to form an efficient seal, a suitable even pressure is provided by the conical projections to maintain contact between the rectifier elements and the casing.

It will be appreciated that, in the above described construction, the casing will constitute one terminal of the assembly and each plate is accordingly provided with a projecting lug which may serve to mount the assembly in a suitable manner besides forming tags to which electrical connection may be made if desired.

We shall describe one form of apparatus embodying our invention, and shall then point out the novel features thereof in claims.

In the accompanying drawings,

Fig. 1 is a plan view, Fig. 2 is a side view, and Fig. 3 is an end cross-section view showing one form of rectifier assembly within a hermetically sealed casing, constructed according to our invention; Fig. 4 is a perspective exploded view showing the various parts of the rectifier assembly and casing in relative locations; and Fig. 5 is a diagrammatic view showing an electric circuit arrangement embodying the rectifier elements and casing plates.

Similar reference characters refer to similar parts in each of the views.

Referring first to Figs. 1 and 2, the completed rectifier assembly is mounted in a hermetically sealed container or casing comprising two metal end or cover plates 1 and 1a separated by two rubber spacer members 2 and 2a. A terminal chamber or hollow lug is formed by portions 3 and 3a of spacer members 2 and 2a, respectively, which project between the cover plates at one end of the casing.

The completed rectifier assembly, including spacer members 2 and 2a, is clamped together between end plates 1 and 1a by a plurality of screws or rivets 5. End plate 1 is provided with two lugs 4, and end plate 1a is provided with two similar lugs 4a, for mounting the case containing the completed rectifier, and also to serve as electrical terminals.

In Figs. 3 and 4, the various pieces of the rectifier assembly are shown in the order in which they are arranged in the case. The various pieces are made in identical pairs, that is, there are two identical end plates, two identical rectifier elements, two identical contact elements, and two identical spacer elements.

In Fig. 3, a rectifier element, comprising a base plate 6 and a counter electrode 7 which may be of the selenium type, is shown with a large portion of its counter electrode 7 in metallic contact with end plate 1. The opposite side of the base plate 6 is in contact with the front surface, as shown in Fig. 4, of a contact member 8.

Contact member 8 has a locating lug or strip 9 which rests in a notch on the opposite side of the upper edge of the adjacent spacer member 2, which is similar to notch 13a in the front side of spacer member 2a. Contact member 8 has also a contact projection or strip 10 which extends into the left-hand space, as shown in Fig. 4, in the terminal chamber which is formed by portions 3 and 3a of spacer members 2 and 2a, respectively.

The spacer members 2 and 2a are arranged so that their inwardly extending portions 11 and 11a, respectively, are in staggered relation to each other. The right-hand portion of the back surface of contact member 8, as shown in Fig. 4, bears against the flat surface of the inwardly extending portion 11 of spacer element 2. The left-hand portion of the back surface of contact member 8 bears against the tops of the conical projections 12a of spacer element 2a. Similarly, the left-hand portion of the front surface of contact member 8a, as shown in Fig. 4, bears against the flat surface of the inwardly extending portion 11a of spacer element 2a. The right-hand portion of the front surface of contact member 8a, as shown in Fig. 4, bears against the tops of the conical projections 12 of spacer element 2.

Locating strip 9a of contact member 8a rests in notch 13a in the front side of spacer element 2a, and contact strip 10a of contact member 8a extends into the right-hand space, as shown in Fig. 4, in the terminal chamber formed by portions 3 and 3a of spacer members 2 and 2a.

The back surface of contact element 8a bears against rectifier element base plate 6a. Counter electrode 7a of this rectifier element is arranged with a large portion of its surface in metallic contact with end plate 1a, as shown in Fig. 3.

In Fig. 5, the rectifier shown in Figs. 1 to 4, inclusive, is connected between a load L and a secondary winding d of a suitable source of alternating current shown as a transformer T. Primary winding m of transformer T is energized from a suitable source having terminals BX and NX. Contact strip 10 is connected with one end of secondary winding d, and contact strip 10a is connected with the opposite end of secondary winding d. An intermediate point of secondary winding d is connected to one side of load L, and the opposite side of load L is connected with lugs 4 and 4a of cover plates 1 and 1a, respectively.

Although we have herein shown and described only one form of apparatus embodying improvements relating to alternating current rectifiers embodying our invention, it is understood that various changes and modifications may be made therein within the scope of the appended claims without departing from the spirit and scope of our invention.

Having thus described our invention, what we claim is:

1. A rectifier comprising a pair of rectifying elements each consisting of a first layer of a given material and a second layer of a given different material contiguous to said first layer and said rectifying elements arranged parallel to and with said first layers toward each other, a contact element for each of said rectifying elements contiguous to its said first layer, resiliently compressible insulating means between and contiguous to said contact elements, and a metal case enclosing said rectifier and in contact with said second layers of said rectifying elements.

2. A rectifier comprising a pair of asymmetric units each consisting of a plate of a given material and a layer of a given different material applied to one side of said plate and said rectifying elements arranged parallel to each other and with said plates toward each other, a contact element for each of said asymmetric units contiguous to its said plate, a metal cover plate for each of said asymmetric units contiguous to and projecting beyond its said layer, and resiliently compressible means placed between said contact elements and between the projecting portions of said cover plates and proportioned so that when said cover plates are forced toward each other the pressure exerted on said asymmetric units is less than the pressure exerted on said projecting portions of said cover plates.

3. A rectifier comprising a pair of asymmetric units each consisting of a plate of a given material and a layer of a given different material applied to one side of said plate and said rectifying elements arranged parallel to each other and with said plates toward each other, a contact element for each of said asymmetric units contiguous to its said plate, a metal cover plate for each of said asymmetric units contiguous to and projecting beyond its said layer, and resiliently compressible means placed between said contact elements and between the projecting portions of said cover plates for hermetically sealing said rectifier and for pressing said contact elements against said first plates and also for pressing said layers against said cover plates when said cover plates are forced toward each other.

4. A rectifier including a pair of asymmetric units each comprising a first layer of a given material and a second layer of a given different material contiguous to said first layer and arranged with said first layers toward each other, a contact element for each of said asymmetric units contiguous to its said first layer, a cover plate for each of said asymmetric units contiguous to and extending beyond its said second layer, continuous resiliently compressible means placed between the extending portions of said cover plates for sealing said rectifier, and resiliently compressible means having a plurality of projections placed between said contact elements for pressing said contact elements against said first layers and also pressing said second layers against said cover plates when said cover plates are forced toward each other.

5. In a rectifier, the combination comprising, a pair of asymmetric units of the plate type arranged adjacent and parallel to each other, a pair of cover plates one of which is placed in contact with the outer side of one of said asymmetric units and the other of which is placed in contact with the outer side of the other asymmetric unit, resiliently compressible means placed between said asymmetric units, and means for forcing said cover plates toward each other.

6. In a rectifier, the combination comprising, a pair of asymmetric units of the plate type arranged adjacent and parallel to each other, a pair of cover plates one of which is placed contiguous to the outer side of one of said asymmetric units and the other of which is placed contiguous to the outer side of the other asymmetric unit and each of which extends beyond the edges of the associated asymmetric unit, and resiliently compressible means placed between said asymmetric units and between the extending portions of said cover plates and constructed so that when said cover plates are forced toward each other the pressure exerted on said asymmetric units is less than the pressure exerted on said extending portions of said cover plates.

7. In a rectifier, the combination comprising, a casing in two parts, a rectifier element, a contact member, and a resiliently compressible gasket having an outer portion between said two parts of said casing serving as a seal between said two parts of said casing and having an inner portion extending between said contact member and one of said parts of said casing for clamping said rectifier element between said contact member and the other part of said casing and designed so that the pressure exerted on said rectifier element is less than that applied between said two parts of said casing.

RICHARD GEOFFREY SELL.
ROGER HARRY CUBITT.

REFERENCES CITED

The following references are of record in the file of this patent:

UNITED STATES PATENTS

| Number | Name | Date |
|---|---|---|
| 2,126,067 | Walter | Aug. 9, 1938 |
| 2,134,131 | Kipphan | Oct. 25, 1938 |
| 2,243,573 | Murphy | May 27, 1941 |
| 2,343,379 | Kotterman | Mar. 7, 1944 |
| 2,461,087 | Sell et al. | Feb. 8, 1949 |